Patented July 10, 1951

2,560,273

UNITED STATES PATENT OFFICE 2,560,273

ELIMINATING CONTAMINATION IN VACUUM TUBES

Anthony H. Briganti, Dorneyville, and Charles E. Buchwald, Bethlehem, Pa., assignors to Western Electric Company, Incorporated, New York, N. Y., a corporation of New York No Drawing. Application November 4, 1949, Serial No. 125,644

4 Claims. (Cl. 316—20)

This invention relates to vacuum tubes and it is an object of this invention to improve the stability of tube characteristics.

Electronic tubes, to be operative, must have a certain minimum thermionic emission and for all tubes of the same type the emission should be reasonably uniform and constant for the period of useful tube life.

In the manufacture of thermionic vacuum tubes, one persistent source of production loss has been poor thermionic emission and instability as revealed by a shifting in tube characteristics during the early hours of tube life. While tubes may be defective in these respects for various reasons it has long been recognized in the tube industry that it is particularly important that the cathodes or filaments of the tubes be kept free of any contaminants which would have an adverse effect on emission.

However, even with the careful observance of best known manufacturing processes many tubes have been found unacceptable. In addition to those rejected for poor initial emission, there are others, with good initial emission, which suffer a temporary reduction in emission at unpredictable times in a life test. This shifting in operating characteristics is caused primarily by contaminants which have entered the tube in some manner during manufacturing processes and which poison the cathode emitting surface either initially or during the tube life. Although this condition usually clears up in a matter of time, it is impossible to predict accurately when it will start or when it will end, and during the time that the contaminants are poisoning the emitting surface, the resultant lowering of emission makes the tube unsuitable for use.

The vacuum tube industry has been endeavoring to isolate these contaminants with the end in view of preventing their affecting the thermionic emission of the tube. It has been believed that these impurities originated in the cathode or plate, and tests in this direction have been made, together with a general review of manufacturing methods and processes. These tests and studies have been unsatisfactory and inconclusive, and the problem has not previously met with an adequate solution.

Applicants have reviewed the results of previous efforts of others in the industry to solve this problem, and after considerable investigation have discovered that boiling the parts of the tube in distilled water before the tube is finally assembled will greatly improve the stability of thermionic emission of these tubes and reduce correspondingly the quantity of rejections on test.

It is applicants' discovery that the poor thermionic emission is caused by poisoning of the emitting surface by contaminants which come primarily from the glass surfaces of the tube and secondarily from parts other than the plate or thermionic emitter, rather than from the plate or the emitter themselves, as was formerly supposed. This fact was first suggested to applicants by the relative inconclusiveness of tests involving various types of cathodes or plate material, and confirmation was obtained when it was discovered that washing the glass surfaces and parts other than the cathodes and plates of tubes before the tubes were assembled reduced the impurities present to a point where they did not interfere with emission. Analysis of the wash water used in these tests reveal that the impurities are primarily sulphates, with smaller amounts of chlorides being present.

Applicants' basic discovery and invention is independent of the theory regarding the manner in which the contaminants are liberated from the internal surfaces of the tube to poison the emitting surface, as the procedure is effective regardless of the theory. However, it is believed that these impurities, which are largely water soluble, are liberated when the tube is heated either during assembly processes or during early activation of the tube, and, when in the form of sulphates, combine with carbon present in the plate material to form a sulphide and carbon monoxide. During activation or early life of the tube, the sulphide which is thus formed reacts with the material of the emitter, with the result being a poisoning of the emitting surface. When impurities in the form of chlorides are present in the tube envelope, it is believed that they reach the emitting surface in a similar manner.

One main way in which these impurities are thought to find their way into the glass portions and other parts of the tube is through various types of gas used for heating purposes in connection with the manufacture of the tubes, the gas usually being supplied through municipal sources. Here again, applicants' discovery as to the cause of poor thermionic emission in tubes is independent of the manner in which these impurities reach the tube parts.

Although experiments have shown that boiling the component parts of the tube other than the plate or emitter for given lengths of time in distilled water will greatly improve the thermionic emission of tubes whose parts are so treated, it is not absolutely necessary that the water used be boiling. Using water at lower than boiling temperatures for relatively longer periods of time will accomplish the same purpose. It is also not necessary that the water be distilled in order to adequately cleanse the parts, but only that the purity of the water be such as to reduce the contaminants to a level sufficiently low to prevent interference with emission. Present information indicates that this level is approximately $1/100$ microgram of contaminating material per square centimeter of surface.

Many detergents are effective in cleaning the parts of their impurities, but best results appear to be obtained when water is used either by itself or in conjunction with other detergents for this purpose. The invention is not to be regarded as limited by the particular method used to remove the contaminants from the parts of the tubes, because although applicants have dissolved these contaminants primarily by heated water, it is obvious that other cleaning methods may be employed which may more or less satisfactorily accomplish the removal of the impurities from the surfaces of the tube parts.

Applicants' contribution to the art of tube manufacturing lies in the discovery that the impurities which most seriously affect the thermionic emission of tubes may be traced to the surfaces of tube parts other than the plate or thermionic emitter, and that these impurities are water soluble and removable by washing. They are the first to recognize the nature of the problem, and to applicants' knowledge their solution marks the first time that it has been possible to manufacture vacuum tubes with assurance of normal emission during the ordinary life of the tube.

It is to be understood that the above described procedures are simply illustrative of the application of the principles of the invention. Numerous other procedures may be readily devised by those skilled in the art which will embody the principles of the invention and fall within the spirit and scope thereof.

What is claimed is:

1. In the manufacture of vacuum tubes having thermionic emitters, envelopes enclosing the emitters, and glass surfaces within the envelope, the step of improving the stability of thermionic emission of the tube which comprises treating the glass surfaces to remove the contaminants therefrom to prevent their transfer to the emitter.

2. In the manufacture of vacuum tubes having thermionic emitters, envelopes enclosing the emitters, and glass surfaces within the envelope, the step of improving the stability of thermionic emission of the tube which comprises washing the glass surfaces in heated water to remove the contaminants therefrom to prevent their transfer to the emitter.

3. In the manufacture of vacuum tubes having thermionic emitters, envelopes enclosing the emitters, and glass surfaces within the envelope, the step of improving the stability of thermionic emission of the tube which comprises washing the glass surfaces in boiling water to remove the contaminants therefrom to prevent their transfer to the emitter.

4. In the manufacture of vacuum tubes having thermionic emitters, a glass envelope and a glass stem, the steps of improving the stability of thermionic emission of the tube which comprises washing the envelope and stem separately in boiling water to remove the contaminants therefrom, joining the two together, and again washing the joint glass structure in boiling water to remove any contaminants introduced in the joining process.

ANTHONY H. BRIGANTI.
CHARLES E. BUCHWALD.

REFERENCES CITED

The following references are of record in the file of this patent:

UNITED STATES PATENTS

| Number | Name | Date |
|---|---|---|
| 1,974,965 | Mattern | Sept. 25, 1934 |
| 2,308,389 | Reyling | Jan. 12, 1943 |
| 2,362,510 | Stutsman | Nov. 14, 1944 |

FOREIGN PATENTS

| Number | Country | Date |
|---|---|---|
| 608,268 | Great Britain | Sept. 13, 1948 |